(12) United States Patent
Hofstee et al.

(10) Patent No.: US 12,006,225 B2
(45) Date of Patent: Jun. 11, 2024

(54) BAYER PROCESS

(71) Applicant: Rio Tinto Alcan International Limited, Montreal (CA)

(72) Inventors: Neil Hofstee, Brisbane (AU); Alistair Gillespie, Mount Crosby (AU); Tomas Mach, Brisbane (AU); Warren Staker, Indooroopilly (AU)

(73) Assignee: Rio Tinto Alcan International Limited, Montreal (CA)

( * ) Notice: Subject to any disclaimer, the term of this patent is extended or adjusted under 35 U.S.C. 154(b) by 21 days.

(21) Appl. No.: 16/971,379

(22) PCT Filed: Feb. 22, 2019

(86) PCT No.: PCT/AU2019/050152
§ 371 (c)(1),
(2) Date: Aug. 20, 2020

(87) PCT Pub. No.: WO2019/161455
PCT Pub. Date: Aug. 29, 2019

(65) Prior Publication Data
US 2021/0009435 A1 Jan. 14, 2021

(30) Foreign Application Priority Data
Feb. 23, 2018 (AU) ................. 2018900584

(51) Int. Cl.
*C01F 7/473* (2022.01)
*B01J 20/18* (2006.01)
(Continued)

(52) U.S. Cl.
CPC ............... *C01F 7/473* (2013.01); *B01J 20/18* (2013.01); *C01F 7/145* (2013.01); *C01F 7/147* (2013.01); *B01J 2220/4887* (2013.01)

(58) Field of Classification Search
CPC .......... C01F 7/473; C01F 7/145; C01F 7/147; C01F 7/47; B01J 20/18; B01J 2220/4887; B01J 20/16
See application file for complete search history.

(56) References Cited

U.S. PATENT DOCUMENTS

| 4,275,042 A | * | 6/1981 | Lever | C01F 7/473 423/127 |
| 4,443,416 A | * | 4/1984 | Donaldson | C01F 7/473 423/121 |

(Continued)

FOREIGN PATENT DOCUMENTS

| AU | 2009201264 A1 | 10/2009 |
| AU | 2007283446 B2 | 11/2013 |

(Continued)

OTHER PUBLICATIONS

Soucy et al., "Organic Control Technologies in Bayer Process", Light Metals 2004, 291-296. (Year: 2004).*

(Continued)

*Primary Examiner* — Wayne A Langel
(74) *Attorney, Agent, or Firm* — Banner & Witcoff, Ltd.

(57) ABSTRACT

A Bayer process increases oxalate removal in the red side of the Bayer process and at least substantially minimises, for example by at least substantially suppressing, precipitation of oxalates in the white side of the Bayer process.

15 Claims, 2 Drawing Sheets

(51) Int. Cl.
*C01F 7/145* (2022.01)
*C01F 7/147* (2022.01)

(56) References Cited

U.S. PATENT DOCUMENTS

| | | | |
|---|---|---|---|
| 4,578,255 A * | 3/1986 | Roe | C01F 7/46 |
| | | | 423/121 |
| 5,118,484 A | 6/1992 | The et al. | |
| 5,385,586 A * | 1/1995 | Farquharson | C01F 7/473 |
| | | | 23/300 |
| 5,547,647 A * | 8/1996 | Moody | C01F 7/473 |
| | | | 423/121 |
| 5,728,180 A | 3/1998 | Williams et al. | |
| 5,888,461 A | 3/1999 | Soirat | |
| 5,902,560 A | 5/1999 | Farquharson | |
| 6,293,973 B1 | 9/2001 | Farquharson et al. | |
| 6,479,024 B1 | 11/2002 | O'Hare et al. | |
| 2003/0064019 A1 | 4/2003 | O'Hare et al. | |
| 2004/0052706 A1 | 3/2004 | Armstrong et al. | |
| 2004/0170546 A1 | 9/2004 | Rosenberg et al. | |
| 2007/0081932 A1 | 4/2007 | Liu et al. | |
| 2008/0159934 A1 | 7/2008 | Kouznetsov et al. | |
| 2009/0169447 A1 * | 7/2009 | Taylor | C01F 7/473 |
| | | | 423/130 |
| 2010/0254866 A1 * | 10/2010 | La | C01F 7/47 |
| | | | 423/122 |

FOREIGN PATENT DOCUMENTS

| | | | | |
|---|---|---|---|---|
| CN | 102502732 A | 6/2012 | | |
| EP | 0989096 B1 | 4/2001 | | |
| FR | 2020340 A1 | 7/1970 | | |
| WO | 2008017109 A1 | 2/2008 | | |
| WO | WO-2008017109 A1 * | 2/2008 | | C01B 33/20 |
| WO | 2008067594 A1 | 6/2008 | | |

OTHER PUBLICATIONS

Apr. 24, 2018 (AU) Search Report—App. No. 2018900584—13 pages.

Apr. 23, 2019 (WO) International Search Report and Written Opinion—App. No. PCT/AU2019/050152—9 pages.

Steven Rosenberg: "Impurity removal in the bayer process" Proceedings of The international Committee for Study of Bauxite, Alumina & Aluminium (ICSOBA), 2017, Alumina Papers, AA08, Available online, URL> http://icsoba.org/node/187.

Aboagye A, et al: "Management and control of silica in the bayer process" Proceedings of the 9th International Alumina Quality Workshop • 2012, pp. 93-97, available online, URL> http://www.aqw.com.au/2012papers.html.

* cited by examiner

BAYER PROCESS

CROSS-REFERENCE TO RELATED APPLICATIONS

This application is a U.S. National Stage application under 35 U.S.C. § 371 of International Application PCT/AU2019/050152, filed Feb. 22, 2019, which claims the benefit of priority to AU Application 2018900584 filed Feb. 23, 2018. Benefit of the filing date of each of these prior applications is hereby claimed. Each of these prior applications is hereby incorporated by reference in its entirety.

TECHNICAL FIELD

The present invention relates to the Bayer process.

The present invention relates to removing organic material, including sodium oxalate (hereinafter referred to as "oxalate" and "oxalates"), from Bayer liquor.

The present invention also relates to managing oxalate contamination in Bayer liquor.

BACKGROUND ART

The process of the invention is applicable to refineries that treat bauxite ore that contain organic material, including oxalates, in the Bayer process.

The following general description of the Bayer process is drawn from a number of publications, primarily a publication entitled "The Bauxite Index"—https://thebauxiteindex.com/en/cbix/industry-101/alumina-101/how-is-alumina-produced/bayer#alumina_101

The Bayer process uses a recirculating volume of concentrated caustic solution to dissolve alumina, separate resultant solids/liquor, and then precipitate alumina tri-hydrate from the liquor. A subsequent calcining step transforms the tri-hydrate to alumina. The basic steps of the Bayer process are as follows.

1. Comminution: Incoming bauxite is ground to a smaller particle size and mixed with highly caustic liquor and forms a slurry.
2. Pre-desilication: The slurry is sent to pre-desilication step (~100° C., atmospheric pressure) to pre-react any clays or other highly reactive silica containing minerals in the bauxite and start the formation of de-silication product (DSP). Pre-desilication minimizes the residence time of the slurry in the more expensive hot digestion stages.
3. Digestion: The pre-desilicated slurry is sent to a digestion step. The slurry is heated to between ~140° C. and 260° C. depending on the type of bauxite. The alumina and reactive silica dissolve and the silica re-precipitates as a DSP. The DSP contains caustic, alumina and silica.
4. Flash down: The heated slurry is cooled to 105° C. and the pressure reduced back to atmospheric by allowing steam evaporation or flashing in a cascade of vessels. DSP formation should be completed in this stage. However, the bulk of the alumina remains dissolved in the liquor.
5. Clarification: The solid and liquid components of the slurry are separated using cascade of settlers or deep cone separators to recover as much of the entrained liquor as possible. The solids component, which is in the form of high solids content mud, is sent to permanent disposal/storage site. The liquid component, which is in the form of pregnant liquor and washings, are sent to filtration or polishing to remove virtually every trace of solids content—helping avoid impurity contamination of the final product and preventing nuclei or fine particulate carryover to the precipitation process.
6. Precipitation: The pregnant liquor is gradually cooled from approximately 80° C. to 65° C. in a cascade of large vessels. The dissolved alumina precipitates as alumina tri-hydrate ($Al_2O_3 \cdot 3H_2O$). The alumina tri-hydrate is hot washed to remove oxalates which also precipitate out of the liquor.
7. Calcination: The alumina tri-hydrate ($Al_2O_3 \cdot 3H_2O$) is calcined at ~1000° C. to drive off all chemically bound water, to leave alumina typically >99.5% $Al_2O_3$.
8. Evaporation: The spent liquor from the precipitation step is heated and subsequently cooled. The condensate is re-used in the process, for example as boiler feed water or for washing bauxite residue. The remaining spent liquor is washed and recycled back to the digestion step.

The steps prior to the precipitation step are described herein as the "red side" of the Bayer process.

The precipitation step and the subsequent steps are described herein as the "white side" of the Bayer process.

The process liquor streams in the Bayer process are described herein as "Bayer liquor".

The above steps 1-8 are hereinafter described herein as "the Bayer process". It is noted that the Bayer process may include additional steps.

Typically, bauxite contains organic material.

At least some of the organic material is carried into Bayer liquor.

Typically, oxalates form a substantial component of the overall organic material in Bayer liquor. Oxalates build up in liquor streams because of direct input from bauxite and from the natural degradation of other organics as Bayer liquor is continually recycled through the Bayer process. Oxalates have an adverse impact on the Bayer process and is targeted for removal in refineries.

There are known methods for oxalate removal from Bayer liquor in the industry.

The present invention provides an alternative process for oxalate removal from Bayer liquor.

The above description is not to be taken as an admission of the common general knowledge in Australia or elsewhere.

SUMMARY OF THE DISCLOSURE

The Bayer process of the invention increases oxalate removal in the red side of the Bayer process and at least substantially minimises, for example by at least substantially suppressing, precipitation of oxalates in the white side of the Bayer process.

The invention controls the Bayer process, including feed materials to the process, to at least substantially minimise, for example by at least substantially suppressing, oxalate precipitation in the white side and to achieve a workable balance of white and red side oxalate removal.

Typically, the invention suppresses oxalate precipitation in the white side and optimises oxalate removal on the red side of the Bayer process.

The Bayer process of the invention is based on trials at the Yarwun refinery of a related company of the applicant that were carried out for another purpose that found surprisingly that at least substantially preventing precipitation of oxalates in the white side of the process at the refinery and increasing oxalate removal in the red side of the Bayer process at the refinery improved the process considerably in terms of the use of reagents and the efficiency of the precipitation step and other steps in the process.

In broad terms, the Bayer process, as described herein, of the invention selectively controls oxalate removal in the red side of the Bayer process and selectively at least substantially minimizes removal of oxalates from solution in Bayer liquor, as described herein, in the white side of the process.

More particularly, the invention provides a Bayer process, as described above, that includes (a) controlling the concentration of oxalates in solution in Bayer liquor, as described herein, to at least substantially minimize, for example by at least substantially suppressing, oxalate precipitation in the precipitation step or otherwise at least substantially minimize oxalate removal from solution in Bayer liquor in the white side of the process and (b) removing oxalates from solution in Bayer liquor in the red side of the process.

The process may include controlling the concentration of oxalates in solution in Bayer liquor on the white side to be unsaturated. Oxalate precipitation cannot occur in unsaturated conditions.

The process may include adding a reagent to Bayer liquor upstream of an alumina tri-hydrate precipitation step of the process that is selected to at least substantially minimize, i.e. suppress, oxalate precipitation in the precipitation step.

The related company of the applicant has found that reagents known in the industry to have oxalate modifying properties, such as carboxylic acids, quaternary ammonium compounds and crystal growth modifiers can be effective to at least substantially minimize, for example by at least substantially suppressing, oxalate precipitation in the precipitation step.

The term "carboxylic acid" is understood herein to describe acids which donate hydrogen ions if a base is present to accept them. A carboxylic acid will react in this way with all bases, both organic (for example, the amines) and inorganic.

The term "quaternary ammonium compound" is understood herein to describe surface active agents that have functional groups that can bond with organic and inorganic surfaces.

The term "crystal growth modifier" is understood herein to describe surface active agents that have functional groups that can bond with the surfaces of oxalate precipitates.

The related company of the applicant has found that concentrations of carboxylic acids, quaternary ammonium compounds or crystal growth modifiers in accordance with the invention adsorb on the surfaces of oxalate crystals and suppress oxalate precipitation. As the concentration of the reagent in Bayer liquor increases, so too does the amount of crystal growth modifier adsorbed.

Whilst not wishing to be bound by the following comment, the applicant believes that the relationship between the identified reagents and oxalate precipitates can be described as an "adsorption isotherm" relationship, most likely of the form described by Langmuir or a variation thereof.

As a primary consequence of reagent adsorption, oxalate crystal growth rate is reduced. Basically, reagents block dissolved oxalates from binding to sites on the existing oxalate crystal surfaces. More reagent adsorbed=more poisoned surface=greater suppression of crystal growth=more oxalate retained in Bayer liquor.

If the reagent dose is sufficient to poison the entirety of the oxalate crystals, oxalate crystallisation can be completely stopped.

If the dose is intermediate, then oxalate crystallisation is only partially suppressed.

These systems are nearly always super-saturated in oxalates, so the thermodynamic incentive to crystallise remains irrespective of poisoning. To continue crystallising oxalates to at least partially relieve super-saturation, an alternative crystal growth mechanism occurs (known as non-crystallographic branching). Instead of being acicular (needles), the resulting particles are spherulitic (bow ties, fans, balls).

Nalco and other reagent suppliers use commercially supplied crystal growth modifiers predominantly for morphology modification and crystal growth suppression of aluminium tri-hydrate and sodium oxalate. The use of crystal growth modifiers in the invention is to change oxalate behavior in precipitation, but then exploiting this in the red side of the Bayer process to drive oxalate into mud (DSP/bauxite residue). Optimising the degree of oxalate suppression in order to achieve a workable balance of white and red side oxalate removal is a different use of crystal growth modifiers.

There is usually a range of organic substances in Bayer liquor that naturally poison oxalates. The optimal reagent dose is highly dependent on the quantity and quality of the natural stabilisers (as determined by factors such as bauxite type and processing conditions, other organic removal processes etc.). The process of optimising oxalate removal is therefore more complex than dialing up a pre-defined reagent dose.

The process may include controlling the concentration of the carboxylic acid in the Bayer liquor upstream of the precipitation step to be at least 10 ppm, typically at least 60 ppm, more typically at least 70 ppm.

The process may include controlling the concentration of the quaternary ammonium compound in the Bayer liquor upstream of the precipitation step to be at least 1 ppm, typically at least 10 ppm, more typically at least 70 ppm.

The process may include controlling the concentration of the crystal growth modifiers in the Bayer liquor upstream of the precipitation step to be at least 40 ppm, typically at least 60 ppm, more typically at least 70 ppm.

Typically, the process includes controlling the concentration of oxalate in solution in Bayer liquor on the red side to be as high as possible to drive oxalate removal from Bayer liquor on the red side of the process without resulting in oxalate precipitation in the precipitation step in the white side of the process, including oxalate precipitation in precipitation tanks, internal surfaces of downstream equipment such as classifiers, pumps, valves and heat exchangers.

The process may include controlling the concentration of oxalate in solution in Bayer liquor to at least 2 g/L, typically at least 2.5 g/L, more typically at least 3 g/l.

The process may include controlling the concentration of oxalate in solution in Bayer liquor to less than 6.5 g/L, typically less than 6 g/L, more typically less than 5.5 g/L.

The process may include controlling the concentration of oxalate in solution in Bayer liquor to a range of 2-4 g/L.

The process may include removing oxalates from solution in Bayer liquor in the red side of the process by absorbing oxalates onto bauxite residues produced in the red side of the process and separated from Bayer liquor in the red side of the process.

The process may include controlling bauxite reactive silica concentration in Bayer liquor to facilitate removal of oxalates from solution in Bayer liquor in the red side of the process.

The applicant has found that there is an inverse relationship between the concentration of oxalates in solution in Bayer liquor and the concentration of reactive silica in bauxite.

More particularly, the applicant has found that, as the bauxite reactive silica concentration increases, the concentration of oxalate in solution in Bayer liquor decreases.

By way of example, the process may include controlling the bauxite reactive silica concentration in Bayer liquor to be below a maximum concentration, noting that the value of the maximum will vary depending on the type of bauxite and Bayer process operating conditions.

In the context of the Bayer process operating at the Yarwun refinery, the process of the invention makes possible the following options for the white side of the Bayer process:

- No oxalate precipitation in the white side of the Bayer process at moderate pregnant liquor oxalate levels—therefore, no oxalate causticisation—this applies to situations where there is a high reactive silica bauxite feed, where the term "high" is understood to mean greater than 8 wt. % reactive silica in the bauxite feed.
- No oxalate precipitation in the white side of the Bayer process at high pregnant liquor oxalate levels—therefore, no oxalate causticisation—this applies to situations where there is a high reactive silica bauxite feed, where the term "high" is understood to mean greater than 8 wt. % reactive silica in the bauxite feed.
- Reduced oxalate precipitation in the white side of the Bayer process—requiring reduced oxalate causticisation,—this applies to situations where there is a low reactive silica bauxite feed, where the term "low" is understood to mean less than 6% wt. % reactive silica in the bauxite feed.

The oxalate removal in the red side of the Bayer process in accordance with the process of the invention may include any one or more of the following steps.

1. Increasing liquor oxalate concentration in Bayer liquor circulating through the process by reducing, i.e. suppressing, or stopping altogether oxalate precipitation in the precipitation step.
2. Increasing oxalate concentration in solution in Bayer liquor by decreasing or stopping altogether conventional methods of oxalate removal, such as oxalate precipitation, in the white side of the Bayer process.
3. Adding Bayer liquor containing oxalates, such as oxalates in solution, to bauxite on the red side of the Bayer process to increase the oxalates in solution in Bayer liquor resulting from digestion of the bauxite in the red side of the process with the increased oxalates in solution driving removal of oxalates, for example as desilication product (DSP), on the red side of the Bayer process.
4. In addition to step 3, adding additional silica to Bayer liquor to further facilitate removal of oxalates, for example as desilication product (DSP), on the red side of the Bayer process.

The process may include heating a slurry from steps 3 and 4 and causing chemical dissolution of alumina in bauxite, thereby causing formation of additional oxalates by decomposition of organic material in bauxite.

The slurry may be heated to a temperature of at least 120° C., typically at least 140° C.

The slurry may be heated to a temperature of less than 300° C., typically less than 280° C.

Typically, the slurry is heated to a temperature in a range of 145-270° C.

The process may further include holding the slurry at a temperature and for a time and forming DSP that incorporates at least as much oxalate as was formed in step 3 above.

The process may include holding the slurry at a temperature of at least 120° C., typically at least 145° C.

The process may include holding the slurry at a temperature for a time of at least 2 minutes, typically 5 minutes.

The process may include holding the slurry at a temperature for a time of less than 60 minutes, typically 50 minutes.

The process may include holding the slurry at a temperature for a time in a range of 5 minutes to 50 minutes.

The process may further include cooling the resultant slurry to a temperature at which solid/liquid separation can be conducted and separating solids and liquor.

The process may include cooling the resultant slurry to a temperature of at least 90° C., typically 100° C.

The process may include cooling the resultant slurry to a temperature less than 120° C., typically less than 110° C.

The process may include cooling the resultant slurry to a temperature in a range of 100-110° C.

The process may further include washing separated solids, often described as bauxite residue (red mud), and disposing of oxalate-containing desilication product with the solids.

The applicant has found that the quantity of oxalates removed with desilication product may depend on any one or more of the following factors:

1. Temperature.
2. Caustic and aluminate concentration
3. Residence time (digestion and pre-desilication).
4. Bauxite composition, specifically reactive silica content and oxalate generation potential.
5. Liquor oxalate concentration.
6. Liquor impurity concentration.

Further, the applicant has realized that there are many potential combinations of process conditions that could result in an acceptable level of digestion oxalate removal with a relationship between oxalate in bauxite residue (DSP-oxalate) and the Bayer digestion parameters such as start liquor oxalate and carbonate concentrations and reactive silica content in bauxite.

The invention also provides a Bayer plant for carrying out the Bayer process of the invention, with the Bayer plant including unit operations for the red side of the process and unit operations for the white side of the process, with the plant being characterized by having no unit operations for oxalate removal on the white side of the plant.

BRIEF DESCRIPTION OF THE DRAWING

The present invention is described further with reference to the accompanying Figures of which.

DESCRIPTION OF EMBODIMENT

The following description is in the context of the Bayer process operating at the Yarwun refinery of a related company of the applicant that processes bauxite at high digestion temperatures, which results in relatively high oxalate input rate to the Bayer process.

The Yarwun refinery does not have side stream removal technology (e.g. oxalate removal from spent Bayer liquor). Instead, the refinery precipitates oxalates in the precipitation step and forms solid phase oxalate ("SPO") and separates SPO in the white side of the Bayer process.

When oxalates precipitates in the precipitation step as SPO on the white side of the Bayer process, the SPO may take several forms. The form of the SPO is strongly dependent on controllable process factors such as temperature and seed wash, as well as on less easily controlled factors such as organic material and inorganic material impurities.

There is a range of organic compounds that have specific effects on both oxalate and hydrate crystallization. These compounds are known generically as oxalate and hydrate active organics.

Some of these compounds may occur naturally in Bayer liquor because of degradation of bauxite organic compounds and reach concentrations in the liquor that influence the size, shape and amount of oxalate crystals formed.

Additional organic compounds, these being collectively known to have oxalate modifying properties such as crystal growth modifiers (crystal growth modifiers) and oxalate stabilisers, may be used to supplement or depress the activity of the natural compounds. These compounds may be obtained as pure materials from generic suppliers or as formulations from specialty suppliers.

Figure 1:
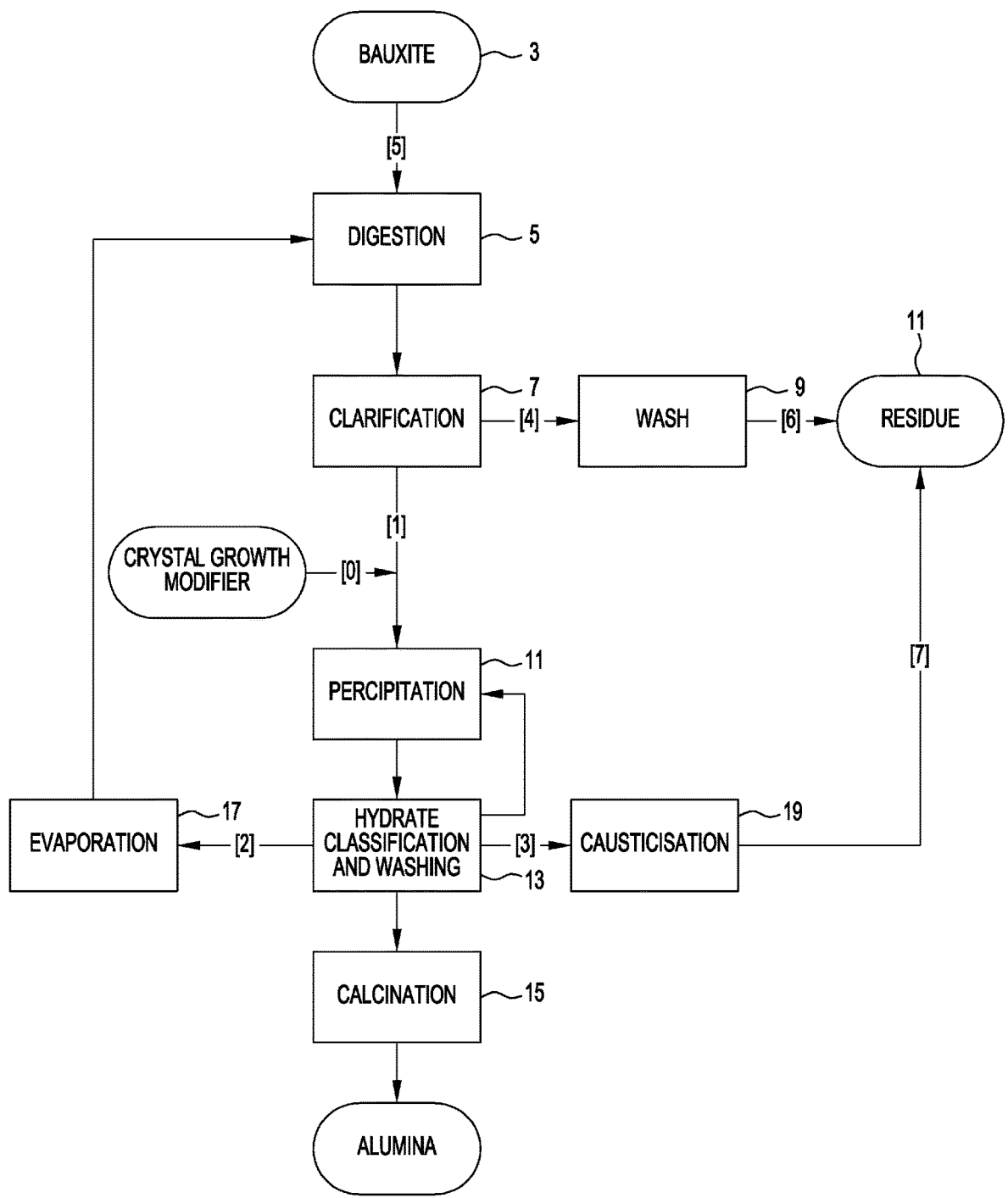
FIG. 1 illustrates an example of a conventional Bayer process flow sheet at the Yarwun refinery of a related company of the applicant.

FIG. 1 shows a schematic flow sheet of the Bayer process flow sheet operating at the Yarwun refinery.

The flow sheet includes the process steps described under the heading "Background Art" above and, in particular, includes the steps:

Digestion of bauxite in a caustic solution.
Clarification (solid/liquid separation of residue from pregnant liquor).
Precipitation of aluminium hydroxide (alumina hydrate).
Return of spent liquor to digestion.

With reference to FIG. 1, bauxite that has been comminuted to a suitable particle size distribution is transferred to a digestion step 3.

The digestion step 3 in the Figure is essentially two steps, namely (a) a pre-disilication step to pre-react any clays or other highly reactive silica containing minerals in the bauxite and start the formation of de-silication product (DSP) and (b) digestion in which a slurry formed in de-silication step (a) is heated to between ~140° C. and 260° C. depending on the type of bauxite, with alumina and reactive silica dissolving and silica re-precipitates as a DSP that comprises caustic, alumina and silica.

The output of the digestion step 3 is transferred to a clarification step 7 which produces a solid output and a liquid output.

The solid output is transferred as a stream [4] to a washing step 9 and forms a residue 11 that is transferred as a residue stream [6] from the washing step 9.

The liquid output, i.e. a Bayer liquor, more particularly a pregnant Bayer liquor, is transferred as a stream [1] to a precipitation step 11. A suitable dose, such as at least 50 ppm, typically greater than 60 ppm, of a crystal growth modifier is added continuously to the Bayer liquor upstream of the precipitation step.

In the precipitation step 11, the dosed Bayer liquor is gradually cooled from approximately 80° C. to 65° C. in a cascade of large vessels. The dissolved alumina precipitates as alumina tri-hydrate ($Al_2O_3 \cdot 3H_2O$).

The output slurry from the precipitation step 11 is transferred to a hydrate classification and washing step 13 and alumina tri-hydrate crystals are hot washed. The outputs of the hydrate classification and washing step 13 are (a) spent liquor that is transferred as a stream [2] to an evaporation step 17 and then to the digestion step 5, (b) washed alumina tri-hydrate crystals that are transferred to a calcination step 15 and produce an output alumina product; and (c) a hydrate wash filtrate that is transferred as a stream [3] to a causticisation step 19. The causticisation step 19 produces a causticisation stream [7] that becomes part of the residue 11.

As noted above, the present invention is based on the results of a series of trials at the Yarwun refinery.

Summary of Refinery Trials

In a planned series of trials on two precipitation trains #1 and #2 at the Yarwun refinery, discussed further below under the heading "Refinery Trials", crystal growth modifier ("CGM") was added continuously to Bayer liquor from the clarification step 7 of the flow sheet shown in FIG. 1, and it was found surprisingly and beneficially that the crystal growth modifier stopped oxalate precipitation in the precipitation step 11 on the white side and there was an increase in oxalate removal on the red side of the process.

Consequently, with reference to the Figure:

(a) the concentration (mass flow) of oxalates in the spent liquor stream [2] from the hydrate classification and washing step 13 became equal to that in the pregnant Bayer liquor stream [1] from the precipitation step 11;
(b) the removal of oxalate via hydrate wash filtrate stream [3] from the hydrate classification and washing step 13 stopped;
(c) oxalate removal via residue solid stream [4] from the clarification step 7 increased; and
(d) the oxalate concentration in solution in pregnant liquor stream [1] from the clarification step 7 and the spent liquor stream [2] from the hydrate classification and washing step 13 increased to a new level.

Refinery liquor and solid oxalate levels, for three distinct operating modes, are set out below in the following table, noting that "0" trains refer to a trial with no crystal growth modifier addition and therefore is a control example and trains "1" and "2" describe the two precipitation trains #1 and #2 at the refinery.

| Case | Bauxite reactive silica (wt %) | CGM addition to 0, 1 or 2 trains | Oxalate crystallisation in precipitation step | DSP-oxalate (wt %) | Pregnant liquor oxalate (g/L) | Spent liquor oxalate (g/L) |
|---|---|---|---|---|---|---|
| Base | >8 | 0 | Yes | 0.3 | 2.5 | 1.5 |
| 1 | >8 | 1 | No | 0.5 | 2.8 | 2.8 |
| 2 | >8 | 2 | No | 0.6 | 3.5 | 3.5 |
| 3 | 6-7 | 2 | No | 0.4 | 4.5 | 4.5 |

The form of the oxalates in the residue solid stream [4] from the clarification step 7 was oxalate-DSP, as determined by crystallographic and chemical analysis methods.

The oxalate in oxalate-DSP was found to be insoluble in vigorous boiling in water; i.e. oxalate was incorporated within the water-insoluble matrix of the DSP.

The preparation of synthetic DSP in contemporaneous laboratory experiments demonstrated a maximum oxalate capacity that was more than 1.5 wt % in pure DSP, i.e. in the absence of competing impurities.

Contemporaneous laboratory bauxite digestion test data provided the basis for a quantitative model for oxalate uptake by DSP. Key factors were found to include, but are not limited to, the following factors:

Reactive silica level in bauxite (4.6-9.8%),
bauxite/liquor charge ratio,
liquor oxalate level, (2-4 g/L),
other liquor impurities (carbonate 9.1-26.3 g/L as $Na_2CO_3$),
digestion temperature and time (273° C. for 7 minutes).

The resulting understanding of the process, discussed herein, allowed the refinery to define an alternative operating mode under which the output of insoluble oxalate via solid residue stream [6] equaled the input of oxalate via digestion of bauxite (stream [5]), and while at the same time ceasing oxalate removal via causticisation stream [7]. Under these conditions the oxalate concentration in the pregnant liquor stream [1] did not exceed the level at which spontaneous or seeded crystallization would occur in the precipitation step.

Refinery Trials

Further to the above summary, the refinery conducted a first plant trial of a crystal growth modifier with an objective of forming and removing oxalate balls. The trial was conducted on one of the two precipitation "trains" at the refinery, as described in FIG. 1.

The crystal growth modifier was added for 21 days without any significant effect being observed, after which the formation of solid phase oxalate ("SPO") crystals in the precipitation step stopped and the SPO inventory in the precipitator began to decline. At 25 days, the circuit was surprisingly effectively oxalate free, with measured SPO being at or below the limit of detection.

Concurrently, the liquor oxalate level in that precipitation train increased but did not exceed the level conventionally thought to be operationally risky.

A range of hypotheses were proposed to explain the elevated liquor oxalate level; these included digestion oxalate suppression, whereby elevated liquor oxalate in digestion prevents further oxalate formation. Each of these hypotheses were ultimately rejected.

With the cessation of oxalate precipitation, the current need to remove SPO from seed and product hydrate streams in the process flow sheet was not necessary. Consequently, seed wash filters and oxalate causticisation systems were idled, and seed/product de-liquor filter performance increased in the trial.

In the absence of SPO, hydrate nucleation rate reduced and the precipitation circuit coarsened. Subsequently the temperature of the precipitation slurry was reduced in the trial to reduce the precipitate size in the circuit, which drove a concomitant increase in hydrate yield.

The overall potential benefits of zero oxalate precipitation in the precipitation step found in the trial were immediately apparent, with these benefits extending from savings in costs of some unit operations to improved hydrate yield.

A second trial was run on the second precipitator train at the refinery, using the same crystal growth modifier ("CGM") additive at similar dose rates to the first trial.

The initial process response in the second trial was equivalent to that observed in the first trial: SPO crystallization stopped after an induction period of 21 days, followed by reduction to minimal SPO inventory, improvement in seed and product filter performance, and then cessation of the usual oxalate causticisation step.

As for the first trial, the hydrate inventory coarsened and yield declined. Growth train temperature was reduced to drive nucleation (hydrate fining mechanism), and coarse seed was added to agglomeration tanks to decrease the agglomeration rate (hydrate coarsening lever).

As for the first trial, the pregnant liquor oxalate concentration increased, but to a level greater. The liquor oxalate concentration increased to a level at which the risk of uncontrolled oxalate precipitation was deemed unacceptable, an alternative oxalate removal path was reconsidered; that of oxalate in bauxite residue.

An analytical method was developed to directly measure oxalate in bauxite residue, i.e. oxalate which is included in the bauxite residue in a form that is not amenable to dissolution in water. A range of bauxite residue samples from the refinery was analyzed, and the results indicated that the level of oxalate in bauxite residue had increased commensurate with the transitions to oxalate stabilization in both precipitation trains. Synthetic DSP samples were analyzed, with the results confirming the potential oxalate sink.

The oxalate removal by the residue oxalate mechanism was roughly equivalent to the previous removal via precipitation of oxalate and subsequent removal in the causticisation step. However, the liquor oxalate level continued to increase.

At this time, an apparent inverse correlation between liquor oxalate and bauxite reactive silica levels was noted, indicative of a dynamic red side oxalate removal process impacting the overall oxalate balance.

Laboratory simulation of oxalate uptake in residue was conducted. Key factors were found to include bauxite type and liquor oxalate level. The resulting data demonstrated that oxalate levels in bauxite residue are strongly dependent on both bauxite composition and liquor impurity levels. A mathematical model was developed to explain the variation in oxalate in bauxite residue level due to key variables.

The process was found to require the cessation of oxalate precipitation in order to drive liquor oxalate to a level sufficient to drive oxalate incorporation in bauxite residue, and to require bauxite with sufficient extractable (reactive) silica to absorb the oxalate—either as part of the bauxite or added to Bayer liquor. Other impurity anions are known to compete with oxalate for the available silica, and these are considered as additional variables in the process package.

In a further plant trial, the plant operated precipitation train #1 at intermediate oxalate stabilisation and train #2 at low oxalate stabilisation.

Under these conditions an oxalate causticisation unit (white side oxalate removal equipment) on train #1 was idled.

Through mixing of process streams between the two trains, the loss of oxalate removal capacity on train #1 was compensated for by increased oxalate removal by a train #2 causticiser and by increased removal via the red side DSP path.

As a consequence, there was measurable increase in the oxalate concentration in spent liquor on both trains.

The measurable increase in the oxalate concentration in spent liquor on both trains is evident in the following table.

|  | Month 1 | Month 2 |
| --- | --- | --- |
| CGM dose Train-1 (ppm) | 0 | 40 |
| CGM dose Train-2 (ppm) | 0 | 0 |
| Oxalate removal via causticiser Train-1 (%) | 14.2 | 0 |
| Oxalate removal via causticiser Train-2 (%) | 22.4 | 28.6 |
| Oxalate removal via red side DSP (%) | 63.3 | 71.4 |
| Oxalate concentration (g/L) | 2.3 | 3.0 |

The table presents monthly average data. Generally, monthly averages are more useful than daily or other shorter-term data because shorter term data tends to be too noisy to make clear conclusions. The data in the table is for two months in which oxalate input from bauxite and output with liquor losses were similar—this allows reasonable confidence in the changes in causticisation (white side removal) and residue/DSP removal (red side) that are attributable to crystal growth modifier addition.

It was found in the refinery trials that red side residue oxalate removal responded rapidly to changing levels of the key drivers of DSP-oxalate inclusion. For example, when bauxite reactive silica concentration changed or when liquor oxalate concentration changed, the DSP sink increased or decreased with immediate effect. This provided a buffer to instability in white side oxalate processes, allowing a focus to remain on managing oxalate behavior in the white side alone.

Therefore, monitoring bauxite reactive silica concentration and liquor oxalate concentration are two control parameters.

Figure 2:
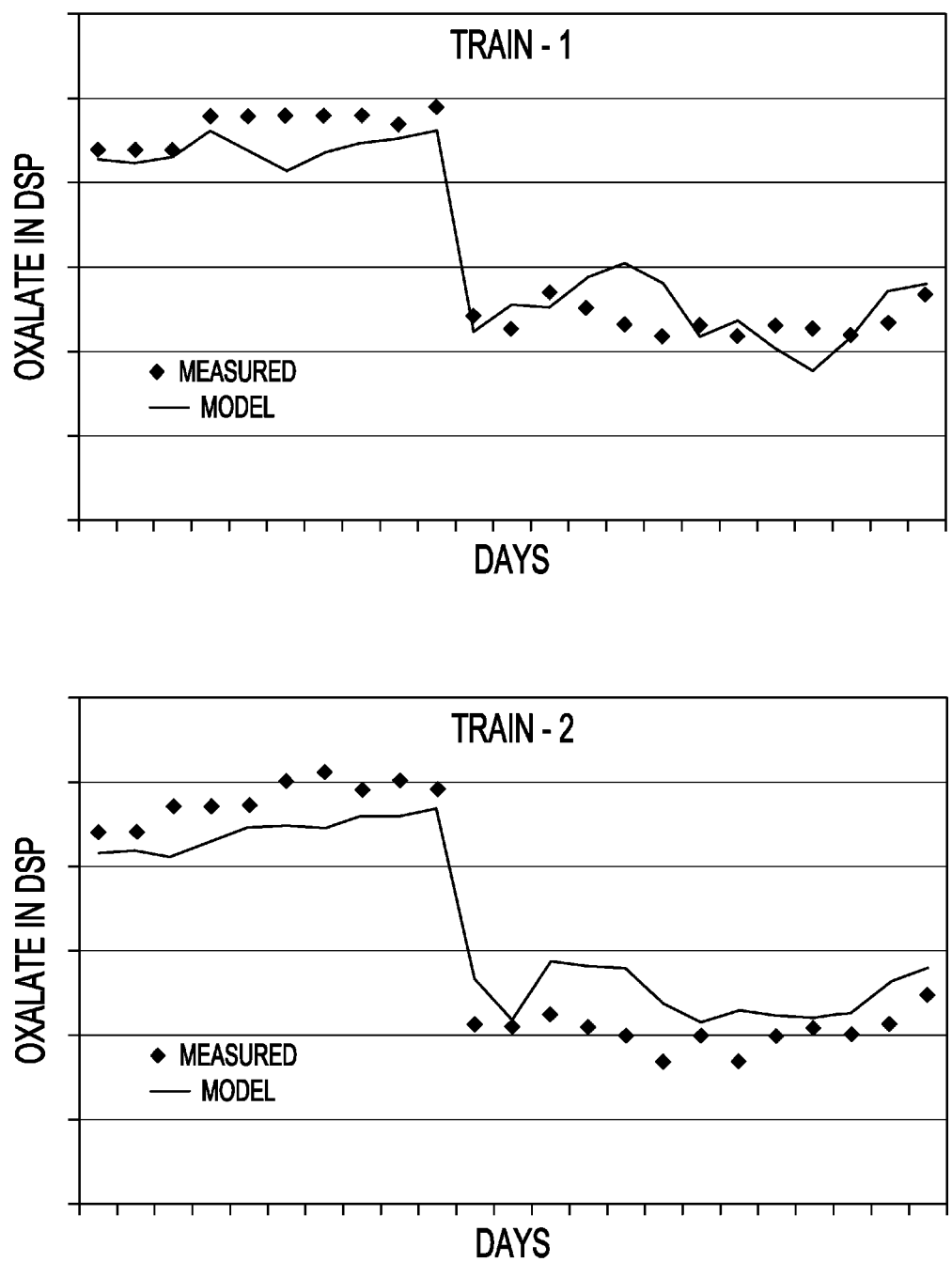
FIG. 2 is two graphs comparing the actual measured results of precipitation train #1 and train #2 at the plant and the results produced by a model developed by the related company of the applicant.

A model that accounts for the impacts of bauxite reactive silica and liquor oxalate and carbonate levels on the level of DSP-oxalate has been developed by the related company of the applicant. The model does not need a time lag between the input factors and the resulting DSP-oxalate levels on both stages, at least for daily intervals. FIG. 2 is two graphs comparing the actual measured results of precipitation train #1 and train #2 at the plant and the results produced by the model. It is clear from FIG. 2 that here is a close correlation between the actual results and the model.

Oxalate crystallisation behavior in white side was controlled by adjusting the dose rate of crystal growth modifier. To sustain varying degrees of oxalate stabilisation, differential doses of crystal growth modifier were applied to the precipitation trains. On train #1, the dose was adjusted to reduce oxalate crystal yield by approximately 75%. On train #2, the dose was adjusted to maximise oxalate crystal yield.

The refinery normally operates a high temperature single stream digestion facility that is fed milled and pre-desilicated bauxite. In a deliberate change an additional stream of differentiated grade bauxite was processed at medium digestion temperature with partial pre-desilication. In another change the reactive silica level and oxalate generation of the primary bauxite stream was changed. The rates of oxalate removal via DSP and other streams were consistently monitored during these changes. The data clearly elaborated an operating window for DSP oxalate removal, thereby defining the limits, and potential optimum conditions, for a red side oxalate removal process. The following table summarises the operating parameters.

| Parameter | Range |
| --- | --- |
| Bauxite reactive silica (%) | 0.1-13 |
| Bauxite oxalate input rate (kg/t Al2O3) | 2-10 |
| Spent liquor oxalate concentration (g/L Na2C2O4) | 1-5.0 |
| Spent liquor carbonate level (g/L Na2CO3) | 0.6-70 |

Alternative crystal growth modifiers were tested in defined plant trials. This work demonstrated the robustness of the DSP oxalate removal process, whose rate was (apparently) unaffected by the presence of diverse chemical additives in white side. The crystal growth modifiers tested include, by way of example, Nalco 7837 and Cytec CYQUEST-178 (both trade marks).

In addition, other carboxylic acids and crystal growth modifiers were found to have different dose response characteristics within white side, with the primary interest being the oxalate stabilisation response mentioned above.

The generic Bayer process is characterised by a diversity of flow sheet designs. It is to be understood that different refineries exhibit differences in design and performance of seed classification, filtration and oxalate causticisation systems particularly, and accordingly, an optimum set of operating conditions for oxalate control and red side DSP removal will be refinery specific.

The trials described above established that the process of the invention successfully suppress oxalate precipitation in the white side of the Bayer process and successfully removes oxalates from Bayer liquor with significant product, capital and process benefits.

Many modifications may be made to the embodiment of the present invention described above without departing from the spirit and scope of the invention.

The invention claimed is:

1. A Bayer process for dissolving alumina contained in bauxite comprising controlling the concentration of oxalates in solution in Bayer liquor in a red side of the process to be as high as possible to drive oxalate removal from Bayer liquor in the red side of the process without resulting in oxalate precipitation in a precipitation step in a white side of the process, the process including: adding a reagent that has oxalate modifying properties to Bayer liquor to minimize oxalate precipitation in the precipitation step, controlling a bauxite reactive silica concentration in Bayer liquor to facilitate removal of oxalates from solution in Bayer liquor in the red side of the process in accordance with a relationship that the concentration of oxalate in solution in Bayer liquor decreases as the bauxite reactive silica concentration increases, and adding Bayer liquor to bauxite on the red side of the process to increase the oxalate concentration in solution in Bayer liquor resulting from digestion of bauxite in the red side of the process, with the increased oxalate in solution driving removal of oxalate as a desilication product (DSP) on the red side of the process.

2. The process defined in claim 1 including heating a slurry produced in the process and causing chemical dissolution of alumina contained in bauxite, thereby causing formation of additional oxalate by decomposition of organic material in bauxite.

3. The process defined in claim 2 further including holding the slurry at a temperature and for a time and forming the DSP that incorporates at least as much oxalate as the increased oxalate.

4. The process defined in claim 3 further including cooling the resultant slurry to a temperature at which solid/liquid separation can be conducted and separating solids and liquor.

5. The process defined in claim 4 further including washing separated solids and disposing of the oxalate-containing desilication product with the solids.

6. The process defined in claim 1 including controlling the concentration of oxalates in solution in Bayer liquor on the white side to be super-saturated.

7. The process defined in claim 1 wherein the reagent is a carboxylic acid.

8. The process defined in claim 1 wherein the reagent is a quaternary ammonium compound.

9. The process defined in claim 1 wherein the reagent is a crystal growth modifier.

10. The process defined in claim 1 including removing oxalates from solution in Bayer liquor in the red side of the process by absorbing oxalates onto bauxite residues produced in the red side of the process and separated from Bayer liquor in the red side of the process.

11. The process defined in claim 1 including controlling the bauxite reactive silica concentration in Bayer liquor to be below a maximum concentration.

12. The process defined in claim 1 including increasing oxalate concentration in Bayer liquor by stopping altogether oxalate precipitation in the precipitation step of the process.

13. The process defined in claim 1 including increasing oxalate concentration in solution in Bayer liquor by stopping altogether oxalate removal in the white side of the process.

14. The process defined in claim 1 including adding additional silica to Bayer liquor to further facilitate removal of oxalate as the desilication product (DSP), on the red side of the process.

15. A Bayer process for dissolving alumina contained in bauxite comprising controlling the concentration of oxalates in solution in Bayer liquor in a red side of the process to be as high as possible to drive oxalate removal from Bayer liquor in the red side of the process without resulting in oxalate precipitation in a precipitation step in a white side of the process, the process including: adding a reagent to Bayer liquor to minimize oxalate precipitation in the precipitation step in the white side of the process, controlling a bauxite reactive silica concentration in Bayer liquor to facilitate removal of oxalates from solution in Bayer liquor in the red side of the process, controlling and removing oxalates from solution in Bayer liquor in the red side of the process by absorbing oxalates into bauxite residues produced in the red side of the process and separated from Bayer liquor in the red side of the process.

* * * * *